US012650594B2

(12) United States Patent
Chang et al.

(10) Patent No.: US 12,650,594 B2
(45) Date of Patent: Jun. 9, 2026

(54) MAINTAINING COLOR CONSISTENCY IN HEAD UP DISPLAY

(71) Applicant: GM Global Technology Operations LLC, Detroit, MI (US)

(72) Inventors: Kai-Han Chang, Madison Heights, MI (US); Thomas A. Seder, Fraser, MI (US); Guy N. Kennerly, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 18/427,151

(22) Filed: Jan. 30, 2024

(65) Prior Publication Data

US 2025/0244576 A1      Jul. 31, 2025

(51) Int. Cl.
*G02B 27/01*      (2006.01)
(52) U.S. Cl.
CPC .. *G02B 27/0101* (2013.01); *G02B 2027/0112* (2013.01); *G02B 2027/0118* (2013.01)
(58) Field of Classification Search
CPC ........ G02B 27/0101; G02B 2027/0112; G02B 2027/0118; G02B 2027/0116; G02B 2027/0183; G02B 2027/0196; B60K 35/00
See application file for complete search history.

(56) References Cited

U.S. PATENT DOCUMENTS

| | | | |
|---|---|---|---|
| 2006/0262371 A1 | 11/2006 | Tan et al. | |
| 2009/0174942 A1* | 7/2009 | Sadamitsu ........... | C09B 31/072 |
| | | | 8/687 |
| 2022/0337791 A1* | 10/2022 | Seder ................... | H04N 9/3105 |
| 2024/0337835 A1* | 10/2024 | Tso .......................... | G02B 1/18 |

FOREIGN PATENT DOCUMENTS

| | | |
|---|---|---|
| DE | 69012420 T2 | 2/1995 |
| DE | 112006001292 T5 | 4/2008 |
| DE | 102016111119 A1 | 12/2017 |
| DE | 202019102486 | 5/2019 |

* cited by examiner

*Primary Examiner* — Mariam Qureshi
(74) *Attorney, Agent, or Firm* — Vivacqua Crane, PLLC

(57) ABSTRACT

A head up display (HUD) system for a vehicle includes a vehicle windshield including a coating applied thereto, and a HUD projector adapted to project an image onto an inner surface of the windshield of the vehicle, wherein, the coating applied to the windshield provides different reflectivity characteristics for different color components of the projected image, and the HUD projector is adapted to individually calibrate a polarization of each of the different color components of the projected image to maintain consistent brightness and intensity characteristics within the image reflected from the inner surface of the windshield.

20 Claims, 4 Drawing Sheets

MAINTAINING COLOR CONSISTENCY IN HEAD UP DISPLAY

INTRODUCTION

The present disclosure relates to a head up display (HUD) system within an automobile. Head-up displays have become common in modern automobiles. HUDs project useful information like speed and navigation information into the driver's field of view. This avoids forcing the driver to look down, away from the road, to read gages on the dash of the automobile. This reduces driver distractions and keeps the driver's eyes on the road.

Modern windshields include various coatings placed thereon which affect the reflectance of the windshield and, consequently, affect the brightness/intensity of images projected by a HUD system that are reflected by the windshield to the eyes of a passenger. Coatings placed on a windshield may affect different colors of the projected image differently. For instance, a windshield coating may provide less reflectivity for a red component of the projected image as compared to the blue and green components of the projected image, and thus, red colors within the image reflected to the passenger will exhibit less brightness or intensity.

While current systems achieve their intended purpose, there is a need for a new and improved HUD system and method for providing a HUD image to a passenger within a vehicle wherein the colors of the projected image have consistent brightness/intensity, as perceived by the passenger.

SUMMARY

According to several aspects of the present disclosure, a head up display (HUD) system for a vehicle includes a vehicle windshield including a coating applied thereto, and a HUD projector adapted to project an image onto an inner surface of the windshield of the vehicle, wherein, the coating applied to the windshield provides different reflectivity characteristics for different color components of the projected image, and the HUD projector is adapted to individually calibrate a polarization of each of the different color components of the projected image to maintain consistent brightness and intensity characteristics within the image reflected from the inner surface of the windshield.

According to another aspect, the HUD projector includes a red laser and a first spatial light modulator (SLM) associated with the red laser, wherein the red laser is adapted to project a red component beam through the first SLM to a collimator, a green laser and a second SLM associated with the green laser, wherein the green laser is adapted to project a green component beam through the second SLM to the collimator, and a blue laser and a third SLM associated with the blue laser, wherein the blue laser is adapted to project a blue component beam through the third SLM to the collimator, wherein, the collimator is adapted to collimate the red component beam, the green component beam and the blue component beam into the image projected to the inner surface of the windshield.

According to another aspect, the HUD projector is adapted to individually calibrate polarization of each of the red component beam, the green component beam and the blue component beam based on reflectivity characteristics of the coating on the windshield such that each of the red component beam, the green component beam and the blue component beam are reflected from the inner surface of the windshield with substantially equal brightness and intensity.

According to another aspect, the reflectivity characteristics of the coating on the windshield are wavelength dependent.

According to another aspect, each of the red laser and first SLM, the green laser and second SLM and the blue laser and third SLM are rotated relative to one another to individually calibrate the polarization of each of the red component beam, the green component beam and the blue component beam based on the wavelength dependent reflectivity characteristics of the coating on the windshield.

According to another aspect, the system further includes a first lens positioned between the first SLM and the collimator and adapted to calibrate the polarization of the red component beam based on the wavelength dependent reflectivity characteristics of the coating on the windshield, a second lens positioned between the second SLM and the collimator and adapted to calibrate the polarization of the green component beam based on the wavelength dependent reflectivity characteristics of the coating on the windshield, and a third lens positioned between the third SLM and the collimator and adapted to calibrate the polarization of the blue component beam based on the wavelength dependent reflectivity characteristics of the coating on the windshield.

According to another aspect, the first lens, the second lens and the third lens are each a waveplate retarder.

According to another aspect, the coating on the windshield is an infrared reflecting (IRR) coating applied to the windshield and adapted to reflect external infrared light away from the windshield, the IRR coating providing reflectivity of the red component beam that is less than reflectivity of the green component beam and the blue component beam.

According to another aspect, the red laser and first SLM are rotated relative to the green laser and second SLM and the blue laser and third SLM such that the red component beam is projected to the collimator at less than full P-polarization based on the wavelength dependent reflectivity characteristics of the coating on the windshield.

According to another aspect, the system further includes a waveplate retarder positioned between the first SLM and the collimator and adapted to calibrate the polarization of the red component beam to less than full P-polarization based on the wavelength dependent reflectivity characteristics of the coating on the windshield.

According to several aspects of the present disclosure, a method of providing images to a passenger within a vehicle using a head up display (HUD) system includes projecting, with a HUD projector, an image onto an inner surface of a windshield of the vehicle, wherein the windshield includes a coating applied thereto that provides different wavelength dependent reflectivity characteristics for different color components of the projected image, and individually calibrating, with the HUD projector, a polarization of each of the different color components of the projected image to maintain consistent brightness and intensity characteristics within the image reflected from the inner surface of the windshield.

According to another aspect, the projecting, with the HUD projector, the image onto the inner surface of the windshield of the vehicle further includes projecting, with a red laser, a red component beam, through a first spatial light modulator (SLM) associated with the red laser, to a collimator, projecting, with a green laser, a green component beam, through a second SLM associated with the green laser, to the collimator, projecting, with a blue laser, a blue component beam, through a third SLM associated with the blue laser, to the collimator, and the method further including collimating, with the collimator, the red component beam, the green component beam and the blue component beam into the image projected to the inner surface of the windshield.

According to another aspect, the individually calibrating, with the HUD projector, the polarization of each of the different color components of the projected image to maintain consistent brightness and intensity characteristics within the image reflected from the inner surface of the windshield further includes individually calibrating, with the HUD projector, the polarization of each of the red component beam, the green component beam and the blue component beam based on reflectivity characteristics of the coating on the windshield such that each of the red component beam, the green component beam and the blue component beam are reflected from the inner surface of the windshield with substantially equal brightness and intensity.

According to another aspect, the individually calibrating, with the HUD projector, the polarization of each of the red component beam, the green component beam and the blue component beam based on reflectivity characteristics of the coating on the windshield further includes rotating each of the red laser and first SLM, the green laser and second SLM and the blue laser and third SLM relative to one another to individually calibrate the polarization of each of the red component beam, the green component beam and the blue component beam based on the wavelength dependent reflectivity characteristics of the coating on the windshield.

According to another aspect, the individually calibrating, with the HUD projector, the polarization of each of the red component beam, the green component beam and the blue component beam based on reflectivity characteristics of the coating on the windshield further includes calibrating, with a first waveplate retarder positioned between the first SLM and the collimator, the polarization of the red component beam based on the wavelength dependent reflectivity characteristics of the coating on the windshield, calibrating, with a second waveplate retarder positioned between the second SLM and the collimator, the polarization of the green component beam based on the wavelength dependent reflectivity characteristics of the coating on the windshield, and calibrating, with a third waveplate retarder positioned between the third SLM and the collimator, the polarization of the blue component beam based on the wavelength dependent reflectivity characteristics of the coating on the windshield.

According to another aspect, the coating on the windshield is an infrared reflecting (IRR) coating applied to the windshield and adapted to reflect external infrared light away from the windshield, the IRR coating providing reflectivity of the red component beam that is less than reflectivity of the green component beam and the blue component beam, and the individually calibrating, with the HUD projector, the polarization of each of the red component beam, the green component beam and the blue component beam based on reflectivity characteristics of the coating on the windshield further includes rotating the red laser and first SLM relative to the green laser and second SLM and the blue laser and third SLM such that the red component beam is projected to the collimator at less than full P-polarization based on the wavelength dependent reflectivity characteristics of the coating on the windshield.

According to another aspect, the coating on the windshield is an infrared reflecting (IRR) coating applied to the windshield and adapted to reflect external infrared light away from the windshield, the IRR coating providing reflectivity of the red component beam that is less than reflectivity of the green component beam and the blue component beam, and the individually calibrating, with the HUD projector, the polarization of each of the red component beam, the green component beam and the blue component beam based on reflectivity characteristics of the coating on the windshield further includes calibrating, with a waveplate retarder positioned between the first SLM and the collimator, the polarization of the red component beam to less than full P-polarization based on the wavelength dependent reflectivity characteristics of the coating on the windshield.

According to several aspects of the present disclosure, a vehicle having a head up display (HUD) system includes a vehicle windshield including a coating applied thereto, a HUD projector adapted to project an image onto an inner surface of the windshield of the vehicle, including a red laser and a first spatial light modulator (SLM) associated with the red laser, wherein the red laser is adapted to project a red component beam through the first SLM to a collimator, a green laser and a second SLM associated with the green laser, wherein the green laser is adapted to project a green component beam through the second SLM to the collimator, and a blue laser and a third SLM associated with the blue laser, wherein the blue laser is adapted to project a blue component beam through the third SLM to the collimator, wherein, the collimator is adapted to collimate the red component beam, the green component beam and the blue component beam into the image projected to the inner surface of the windshield, the coating applied to the windshield is an infrared reflecting (IRR) coating adapted to reflect external infrared light away from the windshield, the IRR coating providing wavelength dependent reflectivity of the red component beam that is less than reflectivity of the green component beam and the blue component beam, and the HUD projector is adapted to individually calibrate a polarization of each of the red component beam, the green component beam and the blue component beam based on reflectivity characteristics of the coating on the windshield such that each of the red component beam, the green component beam and the blue component beam are reflected from the inner surface of the windshield with substantially equal brightness and intensity.

According to another aspect, each of the red laser and first SLM, the green laser and second SLM and the blue laser and third SLM are rotated relative to one another to individually calibrate the polarization of each of the red component beam, the green component beam and the blue component beam based on the wavelength dependent reflectivity characteristics of the coating on the windshield.

According to another aspect, the vehicle further includes a first waveplate retarder positioned between the first SLM and the collimator and adapted to calibrate the polarization of the red component beam based on the wavelength dependent reflectivity characteristics of the coating on the windshield, a second waveplate retarder positioned between the second SLM and the collimator and adapted to calibrate the polarization of the green component beam based on the wavelength dependent reflectivity characteristics of the coating on the windshield, and a third waveplate retarder positioned between the third SLM and the collimator and adapted to calibrate the polarization of the blue component beam based on the wavelength dependent reflectivity characteristics of the coating on the windshield.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
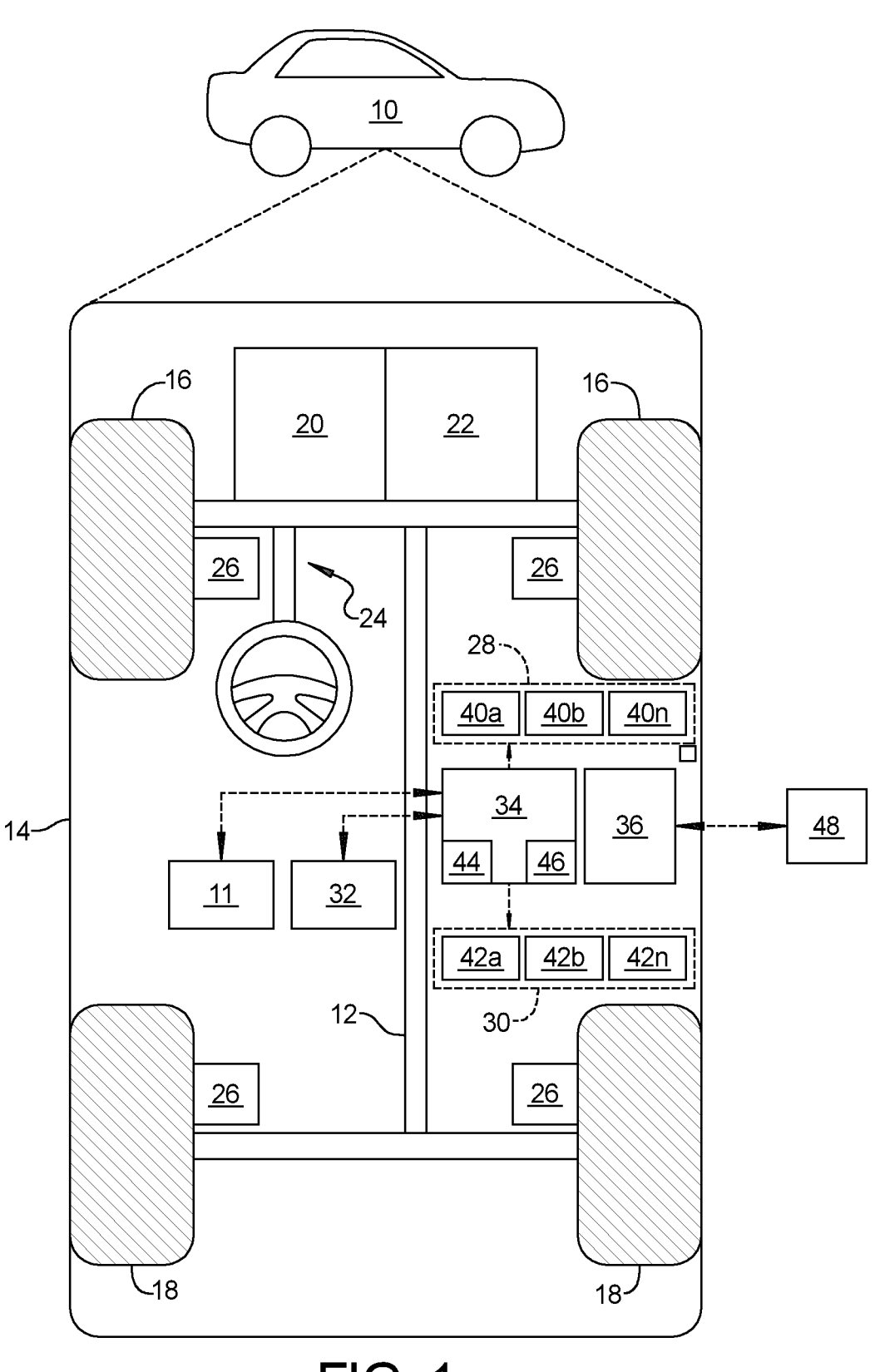
FIG. 1 is a schematic diagram of a vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated head up display

6

(HUD) system 11 for generating an image for a passenger within the vehicle 10 in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The sensing devices 40a-40n can include sensors that monitor dynamic variables of the vehicle, such as its velocity, its acceleration, a number of times that the brake is applied, etc. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figures 2, 3:
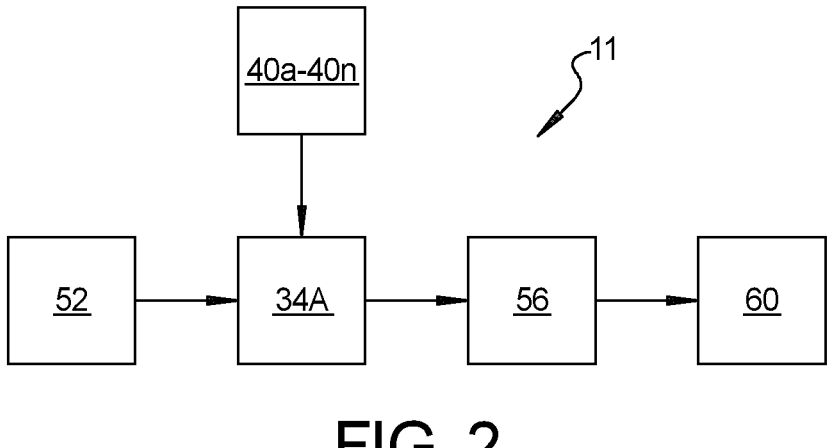
FIG. 2 is a schematic diagram of the HUD system of the present disclosure according to an exemplary embodiment.
FIG. 3 is a schematic view of the HUD system, a vehicle windshield and a passenger within the vehicle.

Referring to FIG. 2, the HUD system includes a passenger monitoring system 52 which includes a camera 54 that is adapted to monitor the position of the passenger's 50 head and eyes. A passenger monitoring system 52, often referred to as a driver monitoring system or DMS, is an artificial intelligence (AI)-based vehicle safety technology that monitors the passenger's 50 attentiveness through the camera 54. Purposes of the passenger monitoring system 52 is to identify the passenger and detect levels of vigilance through software and provide alerts in cases of drowsiness, distractions, etc. to avert accidents. The main features of DMS are driver ID, distraction detection, drowsiness detection, specific activity detection, eyeblink detection, emotion recognition and eyeball tracking. Used within the HUD system 11 of the present disclosure, the primary purpose of the driver monitoring system 52 is to monitor the location of the eyes and head of the passenger 50 and the direction of the gaze of the passenger 50 for determination of images to be displayed by the HUD system and placement of such images.

The HUD system 11 further includes a compute engine 56 in communication with a system controller 34A and the passenger monitoring system 52. The system controller 34A may be the vehicle controller 34 or may be a separate controller in communication with the vehicle controller and adapted to support communication between the system 11 and other systems within the vehicle 10 and to receive data from sensors 40a-40n within the vehicle 10. The compute engine 56 is adapted to calculate an image 58 and encode the image 58 to a HUD projector 60. The HUD projector 60 may be any display suitable for projecting holographic images.

Referring to FIG. 3, the HUD projector 60 of the head up system 11 is adapted to project an image 58 upon an inner surface 62 of a windshield 64 of the vehicle 10. In an exemplary embodiment, the HUD projector 60 a red laser 66R and a first spatial light modulator (SLM) 68R associated with the red laser 66R, wherein the red laser 66R is adapted to project a red component beam 70R through the first SLM 68R to a collimator 72. The HUD projector further includes a green laser 66G and a second SLM 68G associated with the green laser 66G, wherein the green laser 66G is adapted to project a green component beam 70G through the second SLM 68G to the collimator 72, and finally, a blue laser 66B and a third SLM 68B associated with the blue laser 66B, wherein the blue laser 66B is adapted to project a blue component beam 70B through the third SLM 68B to the collimator 72. The collimator 72 is adapted to collimate the red component beam 70R, the green component beam 70G and the blue component beam 70B into the image 58 projected to the inner surface 62 of the windshield 64.

The first SLM 68R is irradiated with light from the red laser 66R and the first SLM 68R diffracts the red laser light with an encoded hologram. When irradiated, each of the first SLM 68R pixels will produce a wavefront having a phase that corresponds to the phase of the position of the hologram encoded at that pixel. The diffracted red laser light, with the hologram encoded therein (the red component beam 70R), then propagates to the collimator 72. The second SLM 68G is irradiated with light from the green laser 66G and the second SLM 68G diffracts the green laser light with an encoded hologram. When irradiated, each of the second SLM 68G pixels will produce a wavefront having a phase that corresponds to the phase of the position of the hologram encoded at that pixel. The diffracted green laser light, with the hologram encoded therein (the green component beam 70R), then propagates to the collimator 72. The third SLM 68B is irradiated with light from the blue laser 66B and the third SLM 68B diffracts the blue laser light with an encoded hologram. When irradiated, each of the third SLM 68B pixels will produce a wavefront having a phase that corresponds to the phase of the position of the hologram encoded at that pixel. The diffracted blue laser light, with the hologram encoded therein (the blue component beam 70R), then propagates to the collimator 72.

The vehicle windshield 64 includes a coating 74 applied thereto. The coating 74 may be a polymer or ceramic coating that is sprayed or coated and dried or cured onto either the inner or outer surface of the windshield 64. The coating 74 may also be a solid layer or sheet of a polymeric or glass material that is positioned adjacent to and against either the inner or outer surface of the windshield 64. The coating 74 is applied to the windshield 64 to provide features beneficial to the passenger 50 within the vehicle 10. For example, the coating 74 may provide tinting of the windshield 64 or anti-glare characteristics.

Such coatings provide different reflectivity characteristics for different color components of the projected image 58. Specifically, the coating 74 provides different reflectivity of a light beam based on the wavelength, and thus, color, of the light beam. Therefore, the coating 74 will provide different reflectivity for the red component beam 70R, the green component beam 70G and the blue component beam 70B of the image 58. This means the brightness and intensity of a particular light beam may be diminished because of lower reflectivity of the coating 74.

For example, in an exemplary embodiment, the coating 74 is an infrared reflecting (IRR) coating applied to the windshield 64 and adapted to reflect external infrared light away from the windshield 64. The IRR coating 74 provides reflectivity of the red component beam 70R that is less than reflectivity of the green component beam 70G and the blue component beam 70B. Thus, when the image 50 is reflected from the inner surface 62 of the windshield 64 to the eyes of the passenger 50, the reflection of the red component beam 70R is less efficient than the reflection of the green component beam 70G and the blue component beam 70B. Thus, red aspects of the projected image 58 will appear less bright and less intense than the green and blue aspects when viewed by the passenger 50.

The HUD projector 60 is adapted to individually calibrate a polarization of each of the different color components of the projected image 58 to maintain consistent brightness and intensity characteristics within the image 58 when the image 58 is reflected from the inner surface 62 of the windshield 64. Thus, the HUD projector 60 is adapted to individually calibrate polarization of each of the red component beam 70R, the green component beam 70G and the blue component beam 70B based on reflectivity characteristics of the coating 74 on the windshield 64 such that each of the red component beam 70R, the green component beam 70G and the blue component beam 70B are reflected from the inner surface 62 of the windshield 64 with substantially equal brightness and intensity.

The red component beam 70R is projected from the red laser 66R and through the first SLM 68R with full P-polarization. Likewise, the green component beam 70G is projected from the green laser 66G and through the second SLM 68G with full P-polarization and the blue component beam 70B is projected from the blue laser 66B and through the third SLM 68B with full P-polarization. Light is an electromagnetic wave, and the electric field of this wave oscillates perpendicularly to the direction of propagation. Light is called unpolarized if the direction of this electric field fluctuates randomly in time. Many common light sources such as sunlight, halogen lighting, LED spotlights, and incandescent bulbs produce unpolarized light. If the direction of the electric field of light is well defined, it is called polarized light. The two orthogonal linear polarization states that are most important for reflection and transmission are referred to as P-polarization and S-polarization. P-polarized light has an electric field polarized parallel to the plane of incidence, while S-polarized light is perpendicular to this plane.

The coating 74 provides wavelength dependent variation of reflectivity of P-polarized light. Polarization of light is measured in degrees, wherein fully S-polarized light is zero degrees (0°) and fully P-polarized light is ninety degrees (90°). In the exemplary embodiment described above, the IRR coating reduces the reflectance of fully P-polarized red light, and thus the brightness and intensity of the red component beam 70R is negatively affected.

For the HUD projector 60 to individually calibrate a polarization of each of the different color components of the projected image 58, the HUD projector 60 must calibrate the polarization by making the polarization less P-polarized. In other words, the fully P-polarized light must be adjusted away from fully P-polarized (90°) and more S-polarized (0°). Referring again to the exemplary embodiment described above, in order to increase the reflectivity of the red component beam 70R, the red component beam 70R is calibrated to have a polarization, for example, of 45°. The adjustment to the polarization of the red component beam 70R reduces the diminishment of reflectivity caused by the coating 74, and thus, the red component beam 70R is reflected from the inner surface 62 of the windshield 64 with brightness and intensity substantially equal to the green component beam 70G and the blue component beam 70B.

Figure 4:
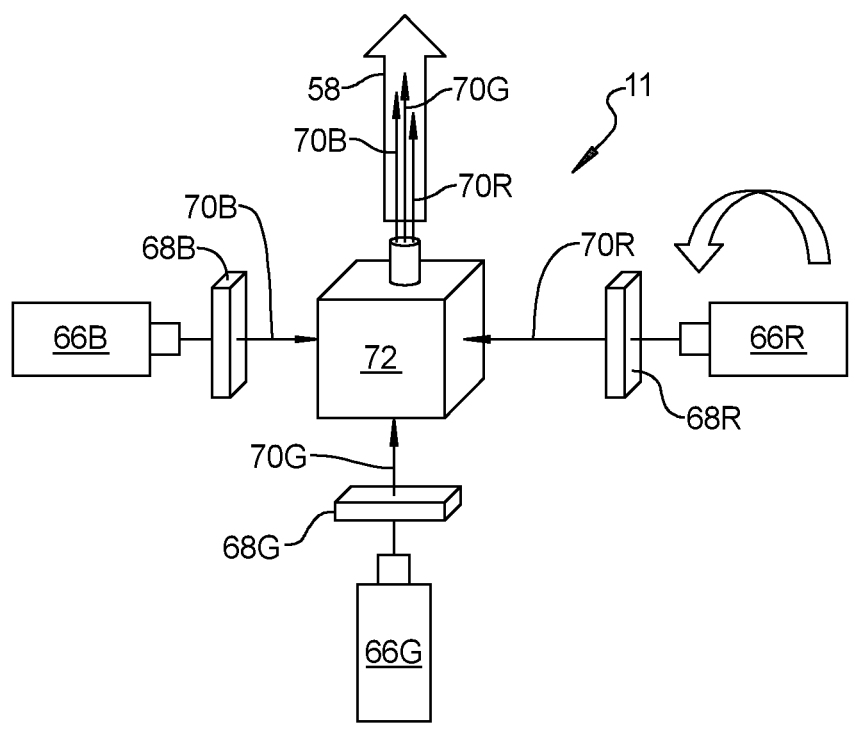
FIG. 4 is a schematic view of the HUD system wherein polarization of component beams is done by rotating a laser/SLM for each component beam.

Referring to FIG. 4, in an exemplary embodiment, each of the red laser 66R and first SLM 68R, the green laser 66G and second SLM 68G and the blue laser 66B and third SLM 68B are rotated relative to one another to individually calibrate the polarization of each of the red component beam 70R, the green component beam 70G and the blue component beam 70B. The calibration of the polarization of each of the red component beam 70R, the green component beam 70G and the blue component beam 70B is based on the wavelength dependent reflectivity characteristics of the coating 74 on the windshield 64 and how the coating 74 specifically affects the reflectivity of each of the red component beam 70R, the green component beam 70G and the blue component beam 70B.

In the example cited above, the IRR coating does not negatively affect the reflectivity of the green component beam 70G and the blue component beam 70B, or at least not to the extent that the IRR coating negatively affects the reflectivity of the red component beam 70R. Thus, the red laser 66R and first SLM 68R can be rotated relative to the green laser 66G/second SLM 68G and the blue laser 66B/third SLM 68B, as indicated by arrow 76, to calibrate the polarization of the red component beam 70R alone, to less than full P-polarization, such that the reflectivity of the red component beam 70R is close to the reflectivity of the green component beam 70G and the blue component beam 70B, thus making the reflectivity and brightness/intensity of the red green and blue component beams 70R, 70G, 70B consistent.

Alternatively, the red laser 66R and first SLM 68R can be rotated along with rotation of each of the green laser 66G/second SLM 68G and the blue laser 66B/third SLM 68B, wherein each of the red laser 66R/first SLM 68R, the green laser 66G/second SLM 68G and the blue laser 66B/third SLM 68B are calibrated to reduce the negative effects of the coating 74 on the relativity of each of the red component beam 70R, the green component beam 70G and the blue component beam 70B. The amount of rotation of each of the red laser 66R/first SLM 68R, the green laser 66G/second SLM 68G and the blue laser 66B/third SLM 68B is individually calculated based on the relative effects of the coating 74 on the reflectivity of each. Thus the polarization of each of the red component beam 70R, the green component beam 70G and the blue component beam 70B are calibrated to both improve the overall brightness/intensity of each of the red component beam 70R, the green component beam 70G and the blue component beam 70B and to ensure that the reflectivity and brightness/intensity of the red green and blue component beams 70R, 70G, 70B are consistent.

Figure 5:
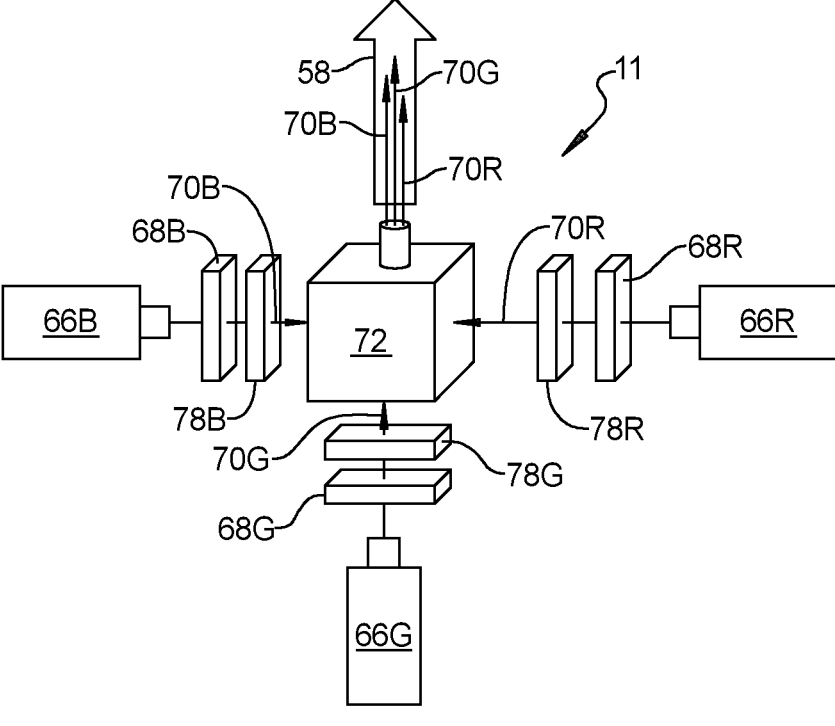
FIG. 5 is a schematic view of the HUD system wherein polarization of component beams is done by lenses positioned between each laser/SLM and a collimator.

Referring to FIG. 5, in another exemplary embodiment, the HUD system 11 further includes a first lens 78R positioned between the first SLM 68R and the collimator 72 and adapted to calibrate the polarization of the red component beam 70R based on the wavelength dependent reflectivity characteristics of the coating 74 on the windshield 64 as the red component beam 70R passes through the first lens 78R. A second lens 78G is positioned between the second SLM 68G and the collimator 72 and is adapted to calibrate the polarization of the green component beam 70G based on the wavelength dependent reflectivity characteristics of the coating 74 as the green component beam 70G passes through the second lens 78G. A third lens 78B is positioned between the third SLM 68B and the collimator 72 and is adapted to calibrate the polarization of the blue component beam 70B based on the wavelength dependent reflectivity characteristics of the coating 74.

In an example, the first lens 78R calibrates the polarization of the red component beam 70R alone, to less than full P-polarization, such that the reflectivity of the red component beam 70R is close to the reflectivity of the green component beam 70G and the blue component beam 70B, thus making the reflectivity and brightness/intensity of the red, green and blue component beams 70R, 70G, 70B consistent.

In another example, the first lens 78R, the second lens 78G and the third lens 78B simultaneously calibrate the polarization of each of the red component beam 70B, the green component beam 70G and the blue component beam 70B to reduce the negative effects of the coating 74 on the reflectivity of each of the red component beam 70R, the green component beam 70G and the blue component beam 70B. The amount of calibration of each of the red component beam 70R, the green component beam 70G and the blue component beam 70B is individually calculated based on the relative effects of the coating 74 on the reflectivity of each. Thus the polarization of each of the red component beam

70R, the green component beam 70G and the blue component beam 70B are calibrated to both improve the overall brightness/intensity of each of the red component beam 70R, the green component beam 70G and the blue component beam 70B and to ensure that the reflectivity and brightness/intensity of the red green and blue component beams 70R, 70G, 70B are consistent.

In an exemplary embodiment, the first lens 78R, the second lens 78G and the third lens 78B are each a waveplate retarder. Waveplate retarders transmit light and modify its polarization state without attenuating, deviating, or displacing the beam. They do this by retarding (or delaying) one component of polarization with respect to its orthogonal component. Each waveplate retarder 78R, 78G, 78B is an optical device that alters the polarization state of a light wave travelling through it. Birefringent polarizers rely on the dependence of the refractive index on the polarization of light. Different polarizations will refract at different angles and this can be used to select certain polarizations of light. In an exemplary embodiment, each lens (waveplate retarder) 78R, 78G, 78B is a birefringent polarizer that is adapted to adjust the ratio of s-polarization to p-polarization in the red, green and blue component beams 70R, 70G, 70B projected through it.

In another exemplary embodiment, each lens/waveplate retarder 78R, 78G, 78B includes a retardation layer having an inorganic birefringent film. The inorganic birefringent film may include columnar nanostructures formed on the lens/waveplate retarder 78R, 78G, 78B by oblique deposition. The columnar structure of inorganic material formed on the lens/waveplate retarder 78R, 78G, 78B defines a birefringent film that retards the propagation of the light beam through the retardation layer resulting in an adjustment to the ratio of S-polarization and P-polarization of the component beam 70R, 70G, 70B that leaves the lens/waveplate retarder 78R, 78G, 78B.

By controlling the thickness and angular orientation of the columnar nanostructures, the ratio of S-polarization and P-polarization of the red component beam 70R, green component beam 70G and the blue component beam 70B projected through the first, second and third lens/waveplate retarder 78R, 78G, 78B can be tuned (reduction in P-polarization) for a particular application, taking into account the relative negative effects of the coating 74 on the reflectivity of the red, green and blue component beams 70R, 70G, 70B.

In an exemplary embodiment, the inorganic birefringent film is grown directly on the lens/waveplate retarder 78R, 78G, 78B. In another exemplary embodiment, the inorganic birefringent film is formed separately and then laminated to the lens/waveplate retarder 78R, 78G, 78B.

In another exemplary embodiment, the retardation layer of each of the lens/waveplate retarder 78R, 78G, 78B includes a liquid crystal lens connected to a voltage source, wherein the birefringent characteristics of the liquid crystal lens vary as the voltage supplied to the liquid crystal lens is varied. Birefringent characteristics of the liquid crystal lens are manipulated by changing the orientation of liquid crystal molecules within the liquid crystal lens when voltage supplied to the liquid crystal lens is varied.

Figure 6:
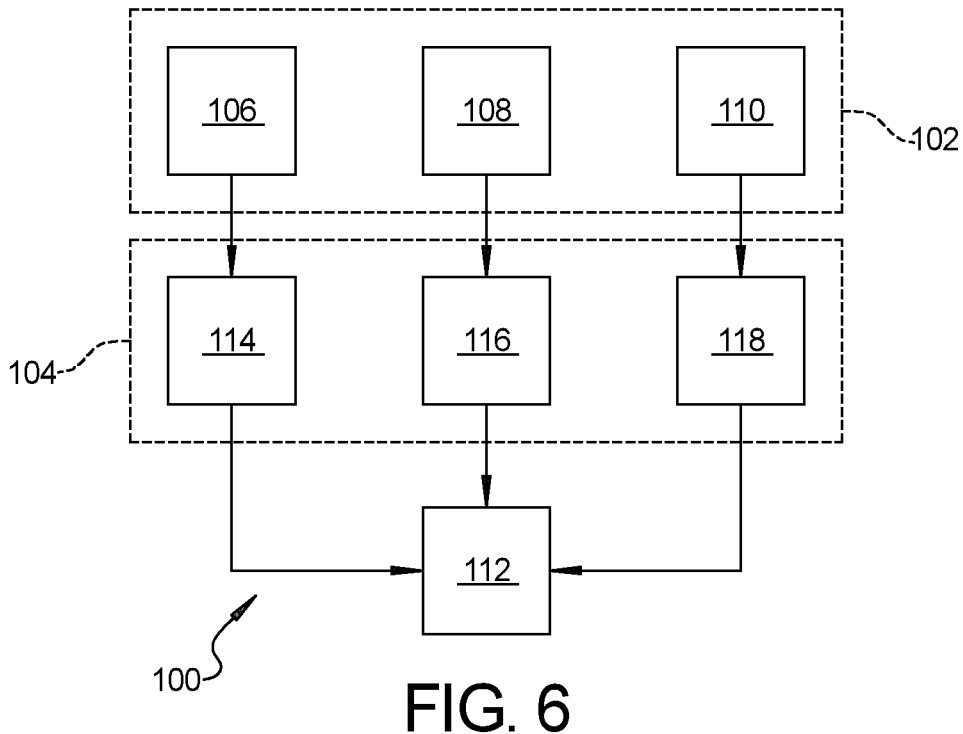
FIG. 6 is a schematic flow chart illustrating a method according to an exemplary embodiment of the present disclosure.

Referring to FIG. 6, a method 100 of providing images to a passenger 50 within a vehicle 10 using a head up display (HUD) system 11 includes, starting at block 102, projecting, with a HUD projector 60, an image 58 onto an inner surface 62 of a windshield 64 of the vehicle 10, wherein the windshield 64 includes a coating 74 applied thereto that provides different wavelength dependent reflectivity characteristics for different color components of the projected image 58, and, moving to block 104, individually calibrating, with the HUD projector 60, a polarization of each of the different color components of the projected image 58 to maintain consistent brightness and intensity characteristics within the image 58 reflected from the inner surface 62 of the windshield 64.

In an exemplary embodiment, the projecting, with the HUD projector 60, the image 58 onto the inner surface 62 of the windshield 64 of the vehicle 10 at block 102 further includes, moving to block 106, projecting, with a red laser 66R, a red component beam 70R, through a first spatial light modulator (SLM) 68R associated with the red laser 66R, to a collimator 72, moving to block 108, projecting, with a green laser 66G, a green component beam 70G, through a second SLM 68G associated with the green laser 66G, to the collimator 72, and moving to block 110, projecting, with a blue laser 66B, a blue component beam 70B, through a third SLM 68B associated with the blue laser 66B, to the collimator 72. The method 100 further including, moving to block 112, collimating, with the collimator 72, the red component beam 70R, the green component beam 70G and the blue component beam 70B into the image 58 projected to the inner surface 62 of the windshield 64.

In another exemplary embodiment, the individually calibrating, with the HUD projector 60, the polarization of each of the different color components of the projected image 58 to maintain consistent brightness and intensity characteristics within the image 58 reflected from the inner surface 62 of the windshield 64 at block 104 further includes, individually calibrating, with the HUD projector 60, the polarization of each of, moving to block 114, the red component beam 70R, moving to block 116, the green component beam 70G and, moving to block 118, the blue component beam 70B based on reflectivity characteristics of the coating 74 on the windshield 64 such that each of the red component beam 70R, the green component beam 70G and the blue component beam 70B are reflected from the inner surface 62 of the windshield 64 with substantially equal brightness and intensity.

In another exemplary embodiment, the individually calibrating, with the HUD projector 60, the polarization of each of the red component beam 70R, at block 114, the green component beam 70G, at block 116, and the blue component beam 70B, at block 118, based on reflectivity characteristics of the coating 74 on the windshield 64 further includes rotating each of the red laser 66R and first SLM 68R, the green laser 66G and second SLM 68G and the blue laser 66B and third SLM 68B relative to one another to individually calibrate the polarization of each of the red component beam 70B, the green component beam 70G and the blue component beam 70B based on the wavelength dependent reflectivity characteristics of the coating 74 on the windshield 64.

In another exemplary embodiment, the individually calibrating, with the HUD projector 60, the polarization of each of the red component beam 70R, at block 114, the green component beam 70G, at block 116, and the blue component beam 70B, at block 118, based on reflectivity characteristics of the coating 74 on the windshield 64 further includes calibrating, with a first waveplate retarder 78R positioned between the first SLM 68R and the collimator 72, the polarization of the red component beam 70R based on the wavelength dependent reflectivity characteristics of the coating 74 on the windshield 64, calibrating, with a second waveplate retarder 78G positioned between the second SLM 68G and the collimator 72, the polarization of the green component beam 70G based on the wavelength dependent reflectivity characteristics of the coating 74 on the windshield 64, and calibrating, with a third waveplate retarder 78B positioned between the third SLM 68B and the collimator 72, the polarization of the blue component beam 70B based on the wavelength dependent reflectivity characteristics of the coating 74 on the windshield 64.

In another exemplary embodiment, the coating 74 on the windshield 64 is an infrared reflecting (IRR) coating 74 applied to the windshield 64 and adapted to reflect external infrared light away from the windshield 64, the IRR coating 74 providing reflectivity of the red component beam 70R that is less than reflectivity of the green component beam 70G and the blue component beam 70B, and the individually calibrating, with the HUD projector 60, the polarization of each of the red component beam 70R, at block 114, the green component beam 70G, at block 116, and the blue component beam 70B, at block 118, based on reflectivity characteristics of the coating 74 on the windshield 64 further includes rotating the red laser 66R and first SLM 68R relative to the green laser 66G and second SLM 68G and the blue laser 66B and third SLM 68B such that the red component beam 70R is projected to the collimator 72 at less than full P-polarization based on the wavelength dependent reflectivity characteristics of the coating 74 on the windshield 64.

In another exemplary embodiment, the coating 74 on the windshield 64 is an infrared reflecting (IRR) coating 74 applied to the windshield 64 and adapted to reflect external infrared light away from the windshield 64, the IRR coating 74 providing reflectivity of the red component beam 70R that is less than reflectivity of the green component beam 70G and the blue component beam 70B, and the individually calibrating, with the HUD projector 60, the polarization of each of the red component beam 70R, at block 114, the green component beam 70G, at block 116, and the blue component beam 70B, at block 118, based on reflectivity characteristics of the coating 74 on the windshield 64 further includes calibrating, with a waveplate retarder 78R positioned between the first SLM 68R and the collimator 72, the polarization of the red component beam 70R to less than full P-polarization based on the wavelength dependent reflectivity characteristics of the coating 74 on the windshield 64.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A head up display (HUD) system for a vehicle, comprising:
    a vehicle windshield including a coating applied thereto; and
    a HUD projector adapted to project an image onto an inner surface of the windshield of the vehicle, the HUD projector including:
        a red laser and a first spatial light modulator (SLM) associated with the red laser, wherein the red laser is adapted to project a red component beam through the first SLM to a collimator;
        a green laser and a second SLM associated with the green laser, wherein the green laser is adapted to project a green component beam through the second SLM to the collimator; and
        a blue laser and a third SLM associated with the blue laser, wherein the blue laser is adapted to project a blue component beam through the third SLM to the collimator;

15 wherein, the collimator is adapted to collimate the red component beam, the green component beam and the blue component beam into the image projected to the inner surface of the windshield; and wherein, the coating applied to the windshield provides different reflectivity characteristics for different color components of the projected image;

a first lens is positioned between the first SLM and the collimator and adapted to calibrate the polarization of the red component beam based on wavelength dependent reflectivity characteristics of the coating on the windshield;

a second lens is positioned between the second SLM and the collimator and adapted to calibrate the polarization of the green component beam based on wavelength dependent reflectivity characteristics of the coating on the windshield; and a third lens is positioned between the third SLM and the collimator and adapted to calibrate the polarization of the blue component beam based on wavelength dependent reflectivity characteristics of the coating on the windshield; and the HUD projector is adapted to individually calibrate a polarization of each of the different color components of the projected image to maintain consistent brightness and intensity characteristics within the image reflected from the inner surface of the windshield.

2. The HUD system of claim 1, wherein:

the first SLM is irradiated with light from the red laser and the first SLM diffracts the red laser light with an encoded hologram;

the second SLM is irradiated with light from the green laser and the second SLM diffracts the green laser light with an encoded hologram; and the third SLM is irradiated with light from the blue laser and the third SLM diffracts the blue laser light with an encoded hologram.

3. The HUD system of claim 1, wherein the HUD projector is adapted to individually calibrate polarization of each of the red component beam, the green component beam and the blue component beam based on reflectivity characteristics of the coating on the windshield such that each of the red component beam, the green component beam and the blue component beam are reflected from the inner surface of the windshield with substantially equal brightness and intensity.

4. The HUD system of claim 1, wherein the coating on the windshield is:

one of a polymer or ceramic coating; and one of sprayed or coated onto the windshield and cured onto one of an inner or outer surface of the windshield; or a solid layer that is positioned adjacent to and against one of the inner or outer surface of the windshield.

5. The HUD system of claim 1, wherein each of the red laser and first SLM, the green laser and second SLM and the blue laser and third SLM are rotated relative to one another to individually calibrate the polarization of each of the red component beam, the green component beam and the blue component beam based on the wavelength dependent reflectivity characteristics of the coating on the windshield.

6. The HUD system of claim 1, wherein the first lens, the second lens and the third lens are each a waveplate retarder.

7. The HUD system of claim 6, wherein the first lens, the second lens and the third lens are each a birefringent polarizer that is adapted to adjust the ratio of s-polarization to p-polarization in the component beam projected through it.

8. The HUD system of claim 1, wherein the coating on the windshield is an infrared reflecting (IRR) coating applied to the windshield and adapted to reflect external infrared light away from the windshield, the IRR coating providing reflectivity of the red component beam that is less than reflectivity of the green component beam and the blue component beam.

9. The HUD system of claim 8, wherein the red laser and first SLM are rotated relative to the green laser and second SLM and the blue laser and third SLM such that the red component beam is projected to the collimator at less than full P-polarization based on the wavelength dependent reflectivity characteristics of the coating on the windshield.

10. The HUD system of claim 8, further including a waveplate retarder positioned between the first SLM and the collimator and adapted to calibrate the polarization of the red component beam to less than full P-polarization based on the wavelength dependent reflectivity characteristics of the coating on the windshield.

11. A method of providing images to a passenger within a vehicle using a head up display (HUD) system, comprising:

projecting, with a HUD projector, an image onto an inner surface of a windshield of the vehicle, wherein the windshield includes a coating applied thereto that provides different wavelength dependent reflectivity characteristics for different color components of the projected image, including:

projecting, with a red laser, a red component beam, through a first spatial light modulator (SLM) associated with the red laser, to a collimator;

projecting, with a green laser, a green component beam, through a second SLM associated with the green laser, to the collimator;

projecting, with a blue laser, a blue component beam, through a third SLM associated with the blue laser, to the collimator; and collimating, with the collimator, the red component beam, the green component beam and the blue component beam into the image projected to the inner surface of the windshield; and individually calibrating, with the HUD projector, a polarization of each of the different color components of the projected image to maintain consistent brightness and intensity characteristics within the image reflected from the inner surface of the windshield, including:

calibrating, with a first waveplate retarder positioned between the first SLM and the collimator, the polarization of the red component beam based on the wavelength dependent reflectivity characteristics of the coating on the windshield;

calibrating, with a second waveplate retarder positioned between the second SLM and the collimator, the polarization of the green component beam based on the wavelength dependent reflectivity characteristics of the coating on the windshield; and calibrating, with a third waveplate retarder positioned between the third SLM and the collimator, the polarization of the blue component beam based on the wavelength dependent reflectivity characteristics of the coating on the windshield.

12. The method of claim 11, wherein:

the projecting, with a red laser, a red component beam, through a first spatial light modulator (SLM) associated with the red laser, to a collimator further includes irradiating the first SLM with light from the red laser and diffracting, with the first SLM, the red laser light with an encoded hologram;

the projecting, with a green laser, a green component beam, through a second SLM associated with the green laser, to the collimator further includes irradiating the second SLM with light from the green laser and diffracting, with the second SLM, the green laser light with an encoded hologram; and the projecting, with a blue laser, a blue component beam, through a third SLM associated with the blue laser, to the collimator further includes irradiating the third SLM with light from the blue laser and diffracting, with the third SLM, the blue laser light with an encoded hologram.

13. The method of claim 12, wherein the individually calibrating, with the HUD projector, the polarization of each of the different color components of the projected image to maintain consistent brightness and intensity characteristics within the image reflected from the inner surface of the windshield further includes individually calibrating, with the HUD projector, the polarization of each of the red component beam, the green component beam and the blue component beam based on reflectivity characteristics of the coating on the windshield such that each of the red component beam, the green component beam and the blue component beam are reflected from the inner surface of the windshield with substantially equal brightness and intensity.

14. The method of claim 13, wherein the individually calibrating, with the HUD projector, the polarization of each of the red component beam, the green component beam and the blue component beam based on reflectivity characteristics of the coating on the windshield further includes rotating each of the red laser and first SLM, the green laser and second SLM and the blue laser and third SLM relative to one another to individually calibrate the polarization of each of the red component beam, the green component beam and the blue component beam based on the wavelength dependent reflectivity characteristics of the coating on the windshield.

15. The method of claim 13, wherein:

the calibrating, with a first waveplate retarder positioned between the first SLM and the collimator, the polarization of the red component beam based on the wavelength dependent reflectivity characteristics of the coating on the windshield further includes calibrating the polarization of the red component beam, with the first waveplate retarder that is a birefringent polarizer adapted to adjust the ratio of s-polarization to p-polarization in the red component beam;

the calibrating, with a second waveplate retarder positioned between the second SLM and the collimator, the polarization of the green component beam based on the wavelength dependent reflectivity characteristics of the coating on the windshield further includes calibrating the polarization of the green component beam, with the second waveplate retarder that is a birefringent polarizer adapted to adjust the ratio of s-polarization to p-polarization in the green component beam; and the calibrating, with a third waveplate retarder positioned between the third SLM and the collimator, the polarization of the blue component beam based on the wavelength dependent reflectivity characteristics of the coating on the windshield further includes calibrating the polarization of the blue component beam, with the third waveplate retarder that is a birefringent polarizer adapted to adjust the ratio of s-polarization to p-polarization in the blue component beam.

16. The method of claim 13, wherein the coating on the windshield is an infrared reflecting (IRR) coating applied to the windshield and adapted to reflect external infrared light away from the windshield, the IRR coating providing reflectivity of the red component beam that is less than reflectivity of the green component beam and the blue component beam, and the individually calibrating, with the HUD projector, the polarization of each of the red component beam, the green component beam and the blue component beam based on reflectivity characteristics of the coating on the windshield further includes rotating the red laser and first SLM relative to the green laser and second SLM and the blue laser and third SLM such that the red component beam is projected to the collimator at less than full P-polarization based on the wavelength dependent reflectivity characteristics of the coating on the windshield.

17. The method of claim 13, wherein the coating on the windshield is an infrared reflecting (IRR) coating applied to the windshield and adapted to reflect external infrared light away from the windshield, the IRR coating providing reflectivity of the red component beam that is less than reflectivity of the green component beam and the blue component beam, and the individually calibrating, with the HUD projector, the polarization of each of the red component beam, the green component beam and the blue component beam based on reflectivity characteristics of the coating on the windshield further includes calibrating, with a waveplate retarder positioned between the first SLM and the collimator, the polarization of the red component beam to less than full P-polarization based on the wavelength dependent reflectivity characteristics of the coating on the windshield.

18. A vehicle having a head up display (HUD) system, comprising:

a vehicle windshield including a coating applied thereto;

a HUD projector adapted to project an image onto an inner surface of the windshield of the vehicle, including:

a red laser and a first spatial light modulator (SLM) associated with the red laser, wherein the red laser is adapted to project a red component beam through the first SLM to a collimator;

a green laser and a second SLM associated with the green laser, wherein the green laser is adapted to project a green component beam through the second SLM to the collimator; and a blue laser and a third SLM associated with the blue laser, wherein the blue laser is adapted to project a blue component beam through the third SLM to the collimator;

wherein:

the collimator is adapted to collimate the red component beam, the green component beam and the blue component beam into the image projected to the inner surface of the windshield;

the coating applied to the windshield is an infrared reflecting (IRR) coating adapted to reflect external infrared light away from the windshield, the IRR coating providing wavelength dependent reflectivity of the red component beam that is less than reflectivity of the green component beam and the blue component beam, the HUD projector further including:

a first waveplate retarder positioned between the first SLM and the collimator and adapted to calibrate the polarization of the red component beam based on the wavelength dependent reflectivity characteristics of the coating on the windshield;

a second waveplate retarder positioned between the second SLM and the collimator and adapted to calibrate the polarization of the green component beam based on the wavelength dependent reflectivity characteristics of the coating on the windshield; and a third waveplate retarder positioned between the third SLM and the collimator and adapted to calibrate the polarization of the blue component beam based on the wavelength dependent reflectivity characteristics of the coating on the windshield; and the HUD projector is adapted to individually calibrate a polarization of each of the red component beam, the green component beam and the blue component beam based on reflectivity characteristics of the coating on the windshield such that each of the red component beam, the green component beam and the blue component beam are reflected from the inner surface of the windshield with substantially equal brightness and intensity.

19. The vehicle of claim 18, wherein each of the red laser and first SLM, the green laser and second SLM and the blue laser and third SLM are rotated relative to one another to individually calibrate the polarization of each of the red component beam, the green component beam and the blue component beam based on the wavelength dependent reflectivity characteristics of the coating on the windshield.

20. The vehicle of claim 18, wherein:

the first waveplate retarder is a birefringent polarizer adapted to adjust the ratio of s-polarization to p-polarization in the red component beam;

the second waveplate retarder is a birefringent polarizer adapted to adjust the ratio of s-polarization to p-polarization in the green component beam; and the third waveplate retarder is a birefringent polarizer adapted to adjust the ratio of s-polarization to p-polarization in the blue component beam.

* * * * *